United States Patent Office 3,489,802
Patented Jan. 13, 1970

3,489,802
PREPARATION OF α-METHYL-1-ADAMANTANE-METHYLAMINE AND α,4 - DIMETHYL - 1 - BICYCLO[2.2.2]OCTANE METHYLAMINE
Loren D. Brake, Wilmington, Del., assignor to E. I. du Pont de Nemours and Company, Wilmington, Del., a corporation of Delaware
No Drawing. Filed Jan. 23, 1967, Ser. No. 610,779
Int. Cl. C07c 85/08, 87/32; A61k 27/00
U.S. Cl. 260—563                                    14 Claims

ABSTRACT OF THE DISCLOSURE

Preparation of α-methyl multicyclic methylamines by reductive amination of corresponding acetyl multicyclic compounds in which ammonia, hydrogen and catalyst are reacted at temperatures up to 250° C. and hydrogenation steps are performed under pressure up to 15,000 pounds per square inch.

Background of invention

The process of this invention is an improvement in performing reductive aminations. This improvement results in surprisingly improved yield of α-methyl multicyclic methylamines of the following formula:

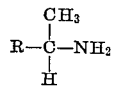

where R is selected from the group consisting of:

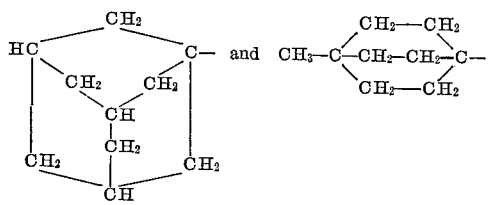

and there is a corresponding decrease in formation of the alcoholic by-products resulting from the side reaction in the reductive aminations known in the art.

The multicyclic compounds produced by the process of this invention are useful as pharmacological agents in animals. The α-methyl-1-adamantanemethylamine is useful as an antiviral agent in animals, while the α,4-dimethyl-1-bicyclo [2.2.2]octane methylamine is useful as an antidepressant agent in animals.

Reductive aminations are known in the art. A review of this type of reaction can be found in "Organic Reactions," vol. 4, page 174 (1948).

The process of the present invention differs from the prior art in that hydrogen and ammonia are not added simultaneously to the starting material. Ammonia and the appropriate multicyclic acetyl, 1-acetyl adamantane or 1-acetyl 4-methylbicyclo [2.2.2]octane is preheated prior to hydrogenation. The result of applicant's discovery is a surprising improvement in yield of the desired products, α-methyl multicyclic methylamines; more particularly α-methyl-1-adamantanemethylamine and α,4-dimethyl-1-bicyclo [2.2.2]octane methylamine.

Summary

The process of this invention is carried out by preheating a mixture of the appropriate multicyclic acetyl and ammonia with agitation, optionally in an inert solvent, and in the presence of a hydrogenation catalyst. Hydrogen is then introduced into the heated system in the presence of a hydrogenation catalyst and optionally an inert solvent at elevated pressure which is maintained until hydrogen consumption ceases. The temperature and pressure of the system are then increased and maintained for a period sufficient to carry the reaction to completion. The resulting α-methyl multicyclic methylamine, α-methyl multicyclic methanol and unreacted multicyclic acetyl is freed of catalyst by filtration.

DESCRIPTION OF THE PREFERRED EMBODIMENTS

Reaction materials

The preparation of 1-acetyladamantane is described in Chem. Ber., 93, 2054 (1960).

The 1-acetyl 4-methylbicyclo [2.2.2]octane is prepared by reacting 4-methylbicyclo [2.2.2]octane-1-carboxylic acid chloride (JACS 86: pages 5183–5188, 1964), with ethoxy magnesiumdiethylmalonate in anhydrous benzene for 50 minutes. The reaction mixture is refluxed for an additional hour, and then cooled in an ice bath. To this cold mixture is added ice followed by sufficient 10% sulfuric acid to cause two clear layers to appear. These layers are separated. The aqueous layer is twice extracted with benzene, said benzene extract being added to the organic layer. This mixture is washed with water and then dried with anhydrous sodium sulfate after which the benzene is removed by vacuum concentration at 40° C. A solution of glacial acetic acid and sulfuric acid is added to the residue and heated at reflux till reaction is complete. The reaction mixture is then extracted with two portions of ether which are combined and dried with anhydrous magnesium sulfate and vacuum concentrated to yield the 1-acetyl, 4-methylbicyclo [2.2.2]octane. The ammonia and hydrogen used in the practice of this invention can be readily obtained from commercial sources or can be prepared by means well known in the art.

Representative catalysts suitable for use in the practice of this invention are; cobalt, ruthenium, and nickel. The above named catalysts can be used as such or supported on materials such as, but not limited to, alumina, kieselguhr, and barium sulfate.

Inert solvent, for the purpose of this invention, is defined as a solvent selected from the group consisting of methanol, ethanol, propanol, dioxane, cyclohexane, dibutylether, diethylether and diisopropylether.

Reaction conditions

Ammonia is mixed with a multicyclic acetyl in a ratio of at least 1 mole ammonia to 1 mole multicyclic acetyl, preferably 1.5 to 5 moles ammonia to each mole of multicyclic acetyl in a suitable pressure vessel. This reaction can successfully be run at ammonia to multicyclic acetyl ratios of greater than 5 to 1 but convenience and cost make the use of higher ratios uneconomic, as the excess of the unreacted products would have to be isolated and recovered.

The amount of inert solvent present, by weight, based on the starting weight the multicyclic acetyl compound is 0%–500%. Since this reaction can be carried on in the absence of solvent, the ratio of solvent utilized is a matter of convenience.

This mixture of ammonia, multicyclic acetyl and inert solvent, if utilized, is heated to a temperature of 120°–220° C., preferably 160°–190° C., with agitation in the presence of from .001% to 10%, by weight of the metal, of the catalyst based on the starting weight of the multicyclic acetyl. It is most convenient for the catalyst to be present while the mixture of ammonia and the multicyclic acetyl are being preheated, however, the catalyst can also be added after this preheating step just prior to pressuring with hydrogen, if desired. This reacting mixture is then held at a temperature of from 120°–220° C., preferably 160°–190° C., for up to 45 minutes.

The temperature range set out as a preferred range above is the range within which the reaction can be most conveniently handled. The range of 160°–190° C. gives the optimum holdup time for the reaction.

The preheated reaction system is then pressured with hydrogen to 100–2,500 pounds per square inch above autogenous pressure, preferably between 500–2,000 pounds per equare inch above autogenous pressure, said pressure being maintained with hydrogen within this range until hydrogen uptake cases. At pressure below 100 pounds per square inch above autogenous pressure the reaction proceeds slowly and is unattractive commercially for this reason. The upper limit for pressure is set not because the reaction fails to proceed at higher pressure, but because the pressures within this range are most convenient for running this reaction. The preferred range of pressure, between 500–2,000 pounds per square inch above autogenous pressure, is set because the reaction proceeds at favorable rates within this range and the cost of pressure vessels increase sharply when this preferred pressure range is exceeded.

Once hydrogen uptake ceases the reaction is carried to completion by increasing the pressure of the system up to 15,000 pounds per square inch and heating to 140°–250° C., and maintaining these conditions for 10 to 60 minutes.

Preferred compounds prepared by the process of this invention include:

α-methyl-1-adamantanemethylamine
α,4-dimethyl-1-bicyclo [2.2.2]octane methylamine The following illustrative examples are presented to better enable me to convey a clear understanding of my invention to persons skilled in this art. Parts and percentages in these examples are by weight unless otherwise specified.

EXAMPLE 1

A mixture of 2000 parts of 1-acetyladamantane, 300 parts ammonia, 200 parts of methanol, and 70 parts of a catalyst consisting of 50% cobalt on kieselguhr is heated to a temperature of 180° C. with agitation and held for 5 minutes in a suitable pressure vessel. The system is pressured with hydrogen to 800 pounds per square inch above autogenous pressure and maintained with hydrogen until hydrogen consumption ceases. The temperature is increased to 220° C. and the pressure raised to 4,500 pounds per square inch with hydrogen and held for 25 minutes. The resulting mixture is freed of catalyst by filtration and analysed: 93.8% α-methyl-1-adamantanemethylamine, 4.7% α - methyl - 1 - adamantanemethanol and 1.5% 1-acetyladamantane based on the adamantane derivatives.

EXAMPLE 2

A mixture of 4000 parts of 1-acetyladamantane, 600 parts ammonia, 600 parts of methanol, and 10 parts of a catalyst consisting of 5% ruthenium on alumina is heated to a temperature of 180° C. with agitation and held for 40 minutes in a suitable pressure vessel. The system is pressured with hydrogen to 1900 pounds per square inch above autogenous pressure and maintained with hydrogen until hydrogen consumption ceases. The temperature is increased to 200° C. and the pressure raised to 5000 pounds per square inch with hydrogen and held for 30 minutes. The resulting mixture is freed of catalyst by filtration and analysed: 94.2% α-methyl-1-adamantanemethylamine, 5.7% α - methyl - 1 - adamantanemethanol and 0.1% 1-acetyladamantane based on the adamantane derivatives.

EXAMPLE 3

A mixture of 1000 parts of 1-acetyladamantane, 500 parts ammonia, 500 parts of methanol, and 20 parts of a catalyst consisting of 50% cobalt on kieselguhr is heated to a temperature of 160° C. with agitation and held for 20 minutes in a suitable pressure vessel. The system is pressured with hydrogen to 1400 pounds per square inch above autogenous pressure and maintained with hydrogen until hydrogen consumption ceases. The temperature is increased to 240° C. and the pressure is raised to 5000 pounds per square inch with hydrogen and held for 10 minutes. The resulting mixture is freed of catalyst by filtration and analysed: 95.7% α-amethyl-1-adamantanemethylamine, 3.8% α - methyl-1-adamanthanemethanol and 0.5% 1-acetyladamantane based on the adamantane derivatives.

EXAMPLE 4

A mixture of 2000 parts of 1-acetyladamantane, 500 parts ammonia, 200 parts methanol, and 70 parts of a catalyst consisting of 50% cobalt on kieselguhr is heated to a temperature of 180° C. with agitation and held for 10 minutes in a suitable pressure vessel. The system is pressured with hydrogen to 900 pounds per square inch above autogenous pressure and maintained with hydrogen until hydrogen consumption ceases. The temperature is increased to 220° C. and the pressure raised to 4400 pounds per square inch with hydrogen and held for 25 minutes. The resulting mixture is freed of catalyst by filtration and analysed: 98.5% α-methyl-1-adamantanemethylamine and 1.5% α-methyl-1-adamantanemethanol.

EXAMPLE 5

A mixture of 2000 parts of 1-acetyladamantane, 350 parts ammonia, 100 parts of methanol, and 25 parts of a catalyst consisting of 5% ruthenium on kieselguhr is heated to a temperature of 180° C. with agitation and held for 10 minutes in a suitable pressure vessel. The system is pressure with hydrogen to 700 pounds per square inch above autogenous pressure and maintained with hydrogen until hydrogen consumption ceases. The temperature is increased to 200° C. and the pressure raised to 4000 pounds per square inch with hydrogen and held for 30 minutes. The resulting mixture is freed of catalyst by filtration and analysed: 96.1% α-methyl-1-adamantanemethylamine, 3.1% α-methyl-1-adamantanemethanol and 0.8% 1-acetyladamantane based on the adamantane derivatives.

EXAMPLE 6

A mixture of 2000 parts of 1-acetyladamantane, 500 parts ammonia, and 25 parts of a catalyst consisting of 5% ruthenium on alumina is heated to a temperature of 180° C. with agitation and held for 10 minutes in a suitable pressure vessel. The system is pressured with hydrogen to 700 pounds per square inch above autogenous pressure and maintained with hydrogen until hydrogen consumption ceases. The temperature is increased to 220° C. and the pressure raised to 2500 pounds per square inch with hydrogen and held for 45 minutes. The resulting mixture is freed of catalyst by filtration and analysed: 95.5% α - methyl - 1 - adamantanemethylamine, 3.9% α-methyl - 1 - adamantanemethanol and 0.6% 1-acetyladamantane based on the adamantane derivatives.

EXAMPLE 7

A mixture of 2000 parts of 1-acetyladamantane, 195 parts ammonia, 500 parts of dioxane, and 20 parts of a catalyst consisting of 50% cobalt on kieselguhr is heated to a temperature of 180° C. with agitation and held for 20 minutes in a suitable pressure vessel. The system is pressured with hydrogen to 700 pounds per square inch above autogenous pressure and maintained with hydrogen until hydrogen consumption ceases. The temperature is increased to 200° C. and the pressure raised to 5000 pounds per square inch with hydrogen and held for 40 minutes. The resulting mixture is freed of catalyst by filtration and analysed: 85.2% α-methyl-1-adamantanemethylamine, 10.4% α-methyl-1-adamantanemethanol and 4.4% 1-acetyladamantane based on the adamantane derivatives.

EXAMPLE 8

A mixture of 2000 parts of 1-acetyladamantane, 500 parts ammonia, 200 parts of dioxane, and 35 parts of a catalyst consisting of 5% ruthenium on barium sulfate is heated to a temperature of 180° C. with agitation in a suitable pressure vessel. The system is pressured with hydrogen to 900 pounds per square inch above autogenous pressure and maintained with hydrogen until hydrogen consumption ceases. The temperature is increased to 220° C. and the pressure raised to 4500 pounds per square inch with hydrogen and held for 25 minutes. The resulting mixture is freed of catalyst by filtration and analysed: 94.5% $\alpha$-methyl-1-adamantanemethylamine, 3.4% $\alpha$-methyl-1-adamantanemethanol and 2.1% 1-acetyladamantane based on the adamantane derivatives.

EXAMPLE 9

A mixture of 2000 parts of 1-acetyladamantane, 500 parts ammonia, 200 parts of methanol, and 50 parts of a catalyst consisting of 50% nickel on kieselguhr is heated to a temperature of 180° C. with agitation and held for 15 minutes in a suitable pressure vessel. The system is pressured with hydrogen to 900 pounds per square inch above autogenous pressure and maintained with hydrogen until hydrogen consumption ceases. The temperature is increased to 220° C. and the pressure raised to 4500 pounds per square inch with hydrogen and held for 30 minutes. The resulting mixture is freed of catalyst by filtration and analysed: 87.0% $\alpha$-methyl-1-adamantanemethylamine, 4.6% $\alpha$-methyl-1-adamantanemethanol and 8.4% 1-acetyladamantane based on the adamantane derivatives.

EXAMPLE 10

A mixture of 2000 parts of 1-acetyladamantane, 500 parts ammonia, 200 parts of methanol, and 70 parts of a catalyst consisting of 50% cobalt on kieselguhr is heated to a temperature of 200° C. with agitation and held for 15 minutes in a suitable pressure vessel. The system is pressured with hydrogen to 500 pounds per square inch above autogenous pressure and maintained with hydrogen until hydrogen consumption ceases. The temperature is increased to 250° C. and the pressure raised to 5000 pounds per square inch with hydrogen and held for 15 minutes. The resulting mixture is freed of catalyst by filtration and analysed: 92.1% $\alpha$-methyl-1-adamantanemethylamine, 7.6% $\alpha$-methyl-1-adamantanemethanol and 0.3% 1-acetyladamantane based on the admantane derivatives.

EXAMPLE 11

A mixture of 2000 parts of 1-acetyladamantane, 500 parts ammonia, 200 parts methanol, and 70 parts of a catalyst consisting of 50% cobalt on kieselguhr is heated to a temperature of 130° C. with agitation and held for 45 minutes in a suitable pressure vessel. The system is pressured with hydrogen to 1900 pounds per square inch above autogenous pressure and maintained with hydrogen until hydrogen consumption ceases. The temperature is increased to 140° C. and the pressure raised to 7500 pounds per square inch with hydrogen and held for 60 minutes. The resulting mixture is freed of catalyst by filtration and analysed: 85.1% $\alpha$-methyl-1-adamantanemethylamine, 11.3% $\alpha$-methyl-1-adamantanemethanol and 3.6% 1-acetyladamantane based on the admantane derivatives.

EXAMPLE 12

A mixture of 2000 parts of 1-acetyladamantane, 300 parts ammonia, 300 parts cyclohexane, and 70 parts of a catalyst consisting of 50% cobalt on kieselguhr is heated to a temperature of 175° C. with agitation and held for 30 minutes in a suitable pressure vessel. The system is pressured with hydrogen to 1400 pounds per square inch above autogenous pressure and maintained with hydrogen until hydrogen consumption ceases. The temperature is increased to 210° C. and the pressure raised to 10,000 pounds per square inch with hydrogen and held for 10 minutes. The resulting mixture is freed of catalyst by filtration and analysed 95.3% $\alpha$-methyl-1-adamantanemethylamine, 4.8% $\alpha$-methyl-1-adamantanemethanol and 0.9% 1-acetyladamantane based on the adamantane derivatives.

EXAMPLE 13

A mixture of 300 parts of 1-acetyladamantane, 150 parts ammonia, 1500 parts of di-n-butylether and 30 parts of a catalyst consisting of 50% cobalt on kieselguhr is heated to a temperature of 180° C. with agitation and held for 8 minutes in a suitable pressure vessel. The system is pressured with hydrogen to 900 pounds per square inch above autogenous pressure and maintained with hydrogen until hydrogen consumption ceases. The temperature is increased to 220° C. and the pressure raised to 4500 pounds per square inch with hydrogen and held for 15 minutes. The resulting mixture is freed of catalyst by filtration and analysed: 96.7% $\alpha$-methyl-1-adamantanemethylamine, 3.1% $\alpha$-methyl-1-adamantanemethanol and 0.2% 1-acetyladamantane based on the adamantane derivatives.

EXAMPLE 14

A mixture of 2000 parts of 1-acetyladamantane, 400 parts ammonia, 200 parts methanol, and 70 parts of a catalyst consisting of 50% cobalt on kieselguhr is heated to a temperature of 180° C. with agitation and held for 10 minutes in a suitable pressure vessel. The system is, pressured with hydrogen to 300 pounds per square inch above autogenous pressure and maintained with hydrogen until hydrogen consumption ceases. The temperature is increased to 220° C. and the pressure raised to 5000 pounds per square inch with hydrogen and held for 20 minutes. The resulting mixture is freed of catalyst by filtration and analysed. 93.8% $\alpha$-methyl-1-adamantanemethylamine, 4.1% $\alpha$-methyl-1-adamantanemethanol and 2.1% 1-acetyladamantane based on adamantane derivatives.

EXAMPLE 15

A mixture of 2000 parts of 1-acetyladamantane, 300 parts ammonia and 200 parts of methanol is heated to a temperature of 180° C. with agitation and held for 5 minutes in a suitable pressure vessel. A mixture of 70 parts of a catalyst and consisting of 50% cobalt on kieselguhr and 200 parts methanol is injected into the pressure vessel. The system is pressured with hydrogen to 1800 pounds per square inch above autogenous pressure and maintained with hydrogen until hydrogen consumption ceases. The temperature is increased to 220° C. and the pressure raised to 4500 pounds per squre inch with hydrogen and held for 25 minutes. The resulting mixture is freed of catalyst by filtration and analysed: 94.8% $\alpha$-methyl-1-adamantanemethylamine, 4.7% $\alpha$-methyl-1-adamantanemethanol and 0.5% 1-acetyladamantane based on the adamantane derivatives.

EXAMPLE 16

A mixture of 2000 parts of 1-acetyl, 4-methylbicyclo [2.2.2]octane, 300 parts ammonia, 200 parts of methanol, and 70 parts of a catalyst consisting of 50% cobalt on kieselguhr is heated to a temperature of 180° C. with agitation and held for 5 minutes in a suitable pressure vessel. The system is pressured with hydrogen to 1500 pounds per square inch above autogenous pressure and maintained with hydrogen until hydrogen consumption ceases. The temperature is increased to 220° C. and the pressure raised to 4500 pounds per square inch with hydrogen and held for 25 minutes. The resulting mixture is freed of catalyst by filtration and analysed: 96.7% $\alpha$,4-dimethyl-1-bicyclo [2.2.2]octane methylamine and 3.3% $\alpha$,4-dimethyl-1-bicyclo [2.2.2]octane methanol based on the bicyclooctane derivatives.

EXAMPLE 17

A mixture of 4000 parts of 1-acetyl, 4 methylbicyclo [2.2.2]octane, 500 parts ammonia, 500 parts of methanol, and 20 parts of a catalyst consisting of 5% ruthenium on alumina is heated to a temperature of 180° C. with agitation and held for 25 minutes in a suitable pressure vessel. The system is pressured with hydrogen to 2000 pounds per square inch above autogenous pressure and maintained with hydrogen until hydrogen consumption ceases. The temperature is increased to 220° C. and the pressure raised to 4500 pounds per square inch with hydrogen and held for 25 minutes. The resulting mixture is freed of catalyst by filtration and analysed: 97.5% α,4-dimethyl-1-bicyclo [2.2.2]octane methylamine, 2.5% α,4-dimethyl-1-bicyclo [2.2.2]octanemethanol based on the bicyclooctane derivatives.

I claim:
1. In a process for preparing compounds of the formula

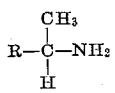

where R is

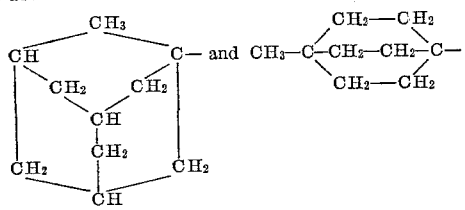

by the reduction amination of a multicyclic compound selected from the class consisting of 1-acetyl adamantane and 1-acetyl bicyclo [2.2.2]octane by heating said multicyclic compound with a mixture of ammonia, hydrogen and a catalyst, the improvement comprising preheating in the absence of hydrogen to a temperature in the range of from 120°–220° C. with agitation a mixture of said multicyclic compound and ammonia and a catalyst selected from the group consisting of cobalt, nickel, and ruthenium, wherein in said mixture said ammonia is present in a molar ratio to said multicyclic compound of at least 1:1 and said catalyst ,calculated as the metal, is present in an amount equivalent to .001%–10% of the starting weight of said multicyclic compound; maintaining said preheated mixture at a temperature of 120°–220° C. for up to 45 minutes, thereafter pressuring said mixture with hydrogen at a pressure in the range of from 100–2,500 pounds per square inch above autogenous pressure until hydrogen uptake ceases, and thereafter heating said mixture to 140°–250° C. and increasing the pressure of the system up to 15,000 pounds per square inch above autogenous pressure until the reaction is completed.

2. The process of claim 1 wherein the molar ratio of ammonia to the multicyclic compound selected from the group consisting of 1-acetyl adamantane and 1-acetyl bicyclo [2.2.2]octane is between 1.5:1 and 5:1.

3. The process of claim 1 wherein the catalyst selected from the group consisting of cobalt, nickel and ruthenium is added to the multicyclic acetyl and ammonia mixture after the preheating step and proceding the initial pressuring with hydrogen.

4. The process of claim 1 wherein the mixture of the multicyclic compound selected from the group consisting of 1-acetyl adamantane and 1-acetyl bicyclo [2.2.2]octane, ammonia and catalyst selected from the group consisting of cobalt, nickel and ruthenium is preheated to a temperature of 160°–190° C.

5. The process of claim 1 wherein the preheated mixture of the multicyclic compound, ammonia and a catalyst selected from the group consisting of cobalt, nickel, and ruthenium after maintaining said preheated mixture at a temperature of 120°–220° C. for up to 45 minutes is pressured with hydrogen at a pressure of 500–2,000 pounds per square inch above autogenous pressure until hydrogen uptake ceases.

6. In a process for preparing compounds of the formula

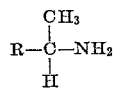

where R is

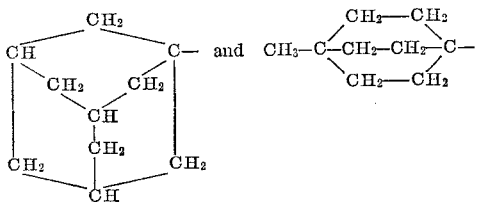

by the reductive amination of a multicyclic compound selected from the group consisting of 1-acetyl adamantane and 1-acetyl bicyclo [2.2.2]octane by heating said multicyclic compound with a mixture of ammonia, hydrogen and a catalyst, the improvement comprising preheating in the absence of hydrogen to a temperature of 120°–220° C., with agitation, a mixture of the multicyclic compound, ammonia, a catalyst selected from the group consisting of cobalt, nickel, and ruthenium, said catalyst, calculated as the metal, is present in an amount equivalent to .001%–10% of the weight of said multicyclic compound and an inert solvent, selected from the group consisting of methanol, ethanol, propanol, dioxane, cyclohexane, dibutylether, diethylether and diisopropyl ether present in an amount equivalent to 1%–500% of the starting weight of said multicyclic compound; maintaining said preheated mixture at a temperature of 120°–220° C. for up to 45 minutes thereafter pressuring said mixture with hydrogen at a pressure in the range of from 100–2,500 pounds per square inch above autogenous pressure until hydrogen uptake ceases, and thereafter heating said mixture in the range of 140°–250° C. at a system pressure up to 15,000 pounds per square inch until the reaction is completed.

7. The process of claim 6 wherein the molar ratio of ammonia to the said multicyclic compound is from 1.5:1 to 5:1.

8. The process of claim 6 wherein the catalyst selected from the group consisting of cobalt, nickel and ruthenium is added to the multicyclic acetyl and ammonia mixture after the preheating step and preceding the initial pressuring with hydrogen.

9. The process of claim 6 wherein the reaction mixture of the multicyclic compound, ammonia, catalyst selected from the group consisting of cobalt, nickel, and ruthenium, and inert solvent selected from the group consisting of methanol, ethanol, propanol, dioxane, cyclohexane, dibutylether, diethylether and diisopropylether is preheated to a temperature in the range of from 160°–190° C.

10. The process of claim 6 wherein said preheated reaction mixture is pressured with hydrogen at a pressure in the range of from 500–2,000 pounds per square inch above autogenous pressure until hydrogen uptake ceases.

11. In a process for preparing α-methyl-1-adamantane-methylamine by the reductive amination of 1-acetyl adamantane by heating said 1-acetyl adamantane with a mixture of ammonia, hydrogen, and a catalyst selected from the group consisting of cobalt, nickel, and ruthenium, the improvement comprising preheating in the absence of hydrogen with agitation a mixture of 1-acetyl adamantane, ammonia and a catalyst selected from the group consisting of cobalt, nickel, and ruthenium, wherein in said mixture said ammonia is in molar ratio to 1-acetyl adamantane of from 1.5:1 to 5:1, wherein said catalyst, calculated as the metal, is present in an amount equivalent to .001%–10% of the starting weight of 1-acetyl adamantane, maintaining said preheated mixture at a temperature of 160°–190° C. for up to 45 minutes, thereafter pressuring said mixture with hydrogen at a pressure in the range of from 500–2,000 pounds per square inch above autogenous pressure until hydrogen uptake ceases, and thereafter heating said mixture in the range of from 140°–250° C. at a system pressure up to 15,000 pounds per square inch until the reaction is completed.

12. In a process for preparing α,4-dimethyl-1-bicyclo [2.2.2]octane methylamine by the reductive amination of 1-acetyl-4-methylbicyclo [2.2.2]octane with a mixture of ammonia, hydrogen and a catalyst selected from the group consisting of cobalt, nickel and ruthenium, the improvement comprising preheating in the absence of hydrogen with agitation a mixture of 1-acetyl-4-methylbicyclo [2.2.2]octane, ammonia and a catalyst selected from the group consisting of cobalt, nickel, and ruthenium, wherein in said mixture said ammonia is in molar ratio to 1-acetyl-4-methylbicyclo [2.2.2]octane of from 1.5:1 to 5:1, wherein said catalyst, calculated as the metal, is present in an amount equivalent to .001%–10% of the starting weight of 1-acetyl-4-methylbicyclo [2.2.2]octane, maintaining said preheated mixture at a temperature of 160°–190° C. for up to 45 minutes, thereafter pressuring said mixture with hydrogen at a pressure in the range of from 500–2,000 pounds per square inch above autogenous pressure until hydrogen uptake ceases, and thereafter heating said mixture in the range of from 140°–250° C. at a system pressure up to 15,000 pounds per square inch until the reaction is completed.

13. In a process for preparing α-methyl-1-adamantanemethylamine by the reductive amination of 1-acetyl adamantane by heating said 1-acetyl adamantane with a mixture of ammonia, hydrogen a catalyst, and solvent, the improvement comprising preheating in the absence of hydrogen with agitation a mixture of 1-acetyl adamantane, ammonia, wherein said mixture ammonia is present in a molar ratio to said 1-acetyl adamantane of between 1.5:1 and 5:1, a catalyst selected from the group consisting of cobalt, nickel, and ruthenium, wherein in said mixture the catalyst, calculated as the metal, is present in an amount equivalent to .001%–10% of the starting weight of said 1-acetyl adamantane, and an inert solvent selected from the group consisting of methanol, ethanol, propanol, dioxane, cyclohexane, dibutylether, diethylether and diisopropylether is present in an amount equivalent to 5% to 50% of the starting weight of 1-acetyl adamantane; maintaining said preheated mixture at a temperature of from 160°–190° C. for up to 45 minutes thereafter pressuring said mixture with hydrogen at a pressure in the range of from 500–2,000 pounds per square inch above autogenous pressure, until hydrogen uptake ceases, and thereafter heating in the range of 140°–250° C. at a system pressure up to 15,000 pounds per square inch until the reaction is completed.

14. In a process for preparing α,4-dimethyl-1-bicyclo [2.2.2]octane methylamine by the reductive amination of 1-acetyl-4-methylbicyclo [2.2.2]octane by heating said 1-acetyl-4-methylbicyclo [2.2.2]octane with a mixture of ammonia, hydrogen, a catalyst, and solvent, the improvement comprising preheating in the absence of hydrogen with agitation a mixture of 1-acetyl-4-methylbicyclo [2.2.2]octane, ammonia, wherein in said mixture ammonia is present in a molar ratio to said 1-acetyl-4-methylbicyclo [2.2.2]octane of between 1.5:1 and 5:1, a catalyst selected from the group consisting of cobalt, nickel, and ruthenium, wherein in said mixture the catalyst, calculated as the metal, is present in an amount equivalent to .001%–10% of the starting weight of said 1-acetyl-4-methylbicyclo [2.2.2]octane, and an inert solvent selected from the group consisting of methanol, ethanol, propanol, dioxane, cyclohexane, dibutylether, diethylether and diisopropylether is present in an amount equivalent to 5% to 50% of the starting weight of 1-acetyl-4-methylbicyclo [2.2.2]octane; maintaining said preheated mixture at a temperature of from 160°–190° C. for up to 45 minutes thereafter pressuring said mixture with hydrogen at a pressure in the range of from 500–2,000 pounds per square inch above autogenous pressure, until hydrogen uptake ceases, and thereafter heating in the range of 140°–250° C. at a system pressure up to 15,000 pounds per square inch until the reaction is completed.

References Cited

UNITED STATES PATENTS 2,885,439    5/1959    Zeinty _____ 260—563

CHARLES B. PARKER, Primary Examiner

C. F. WARREN, Assistant Examiner

U.S. Cl. X.R.

260—999